United States Patent
Mizukoshi et al.

(10) Patent No.: US 7,639,446 B2
(45) Date of Patent: Dec. 29, 2009

(54) DISK DRIVE DEVICE AND SERVO WRITE METHOD

(75) Inventors: Seiji Mizukoshi, Hamura (JP); Hideo Sado, Ome (JP); Toshitaka Matsunaga, Akishima (JP); Shouji Nakajima, Kodaira (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/248,827

(22) Filed: Oct. 9, 2008

(65) Prior Publication Data

US 2009/0168218 A1 Jul. 2, 2009

(30) Foreign Application Priority Data

Dec. 27, 2007 (JP) ............... 2007-338250

(51) Int. Cl.
*G11B 21/10* (2006.01)
(52) U.S. Cl. .......................... 360/75; 360/51
(58) Field of Classification Search ....................... None
See application file for complete search history.

(56) References Cited

U.S. PATENT DOCUMENTS

| | | | |
|---|---|---|---|
| 5,668,679 A | 9/1997 | Swearingen et al. | |
| 6,324,027 B1 | 11/2001 | Chainer et al. | |
| 6,674,602 B2 | 1/2004 | Miles | |
| 6,965,489 B1 | 11/2005 | Lee et al. | |
| 7,009,802 B1 | 3/2006 | Ehrlich | |
| 7,158,336 B2 * | 1/2007 | Chan et al. | 360/77.05 |
| 7,230,789 B1 * | 6/2007 | Brunnett et al. | 360/75 |
| 7,251,095 B1 * | 7/2007 | Rigney et al. | 360/75 |
| 7,253,985 B1 * | 8/2007 | Gami et al. | 360/75 |
| 7,286,317 B1 * | 10/2007 | Li et al. | 360/77.04 |
| 7,333,280 B1 * | 2/2008 | Lifchits et al. | 360/75 |
| 7,391,584 B1 * | 6/2008 | Sheh et al. | 360/75 |
| 7,411,758 B1 * | 8/2008 | Cheung et al. | 360/75 |
| 7,499,234 B1 * | 3/2009 | Rigney et al. | 360/75 |
| 2007/0121235 A1 | 5/2007 | Sai et al. | |
| 2007/0195445 A1 * | 8/2007 | Vanlaanen et al. | 360/75 |
| 2007/0273996 A1 * | 11/2007 | Watt et al. | 360/75 |
| 2008/0151412 A1 * | 6/2008 | Nakajima et al. | 360/77.02 |

* cited by examiner

*Primary Examiner*—Hoa T Nguyen
*Assistant Examiner*—James L Habermehl
(74) *Attorney, Agent, or Firm*—Knobbe, Martens, Olson & Bear LLP

(57) ABSTRACT

According to one embodiment, a servo write module is configured to write radial servo patterns on the disk media using a first spiral servo pattern of the spiral servo patterns as a base pattern for tracing, to detect a shift amount of a sync mark position in each of other spiral servo patterns with respect to a sync mark position in the first spiral servo pattern, and to adjust, when the base pattern is switched from the first spiral servo pattern to a second spiral servo pattern of the spiral servo patterns, a phase of the servo write clock based on the detected shift amount corresponding to the second spiral servo pattern.

9 Claims, 14 Drawing Sheets

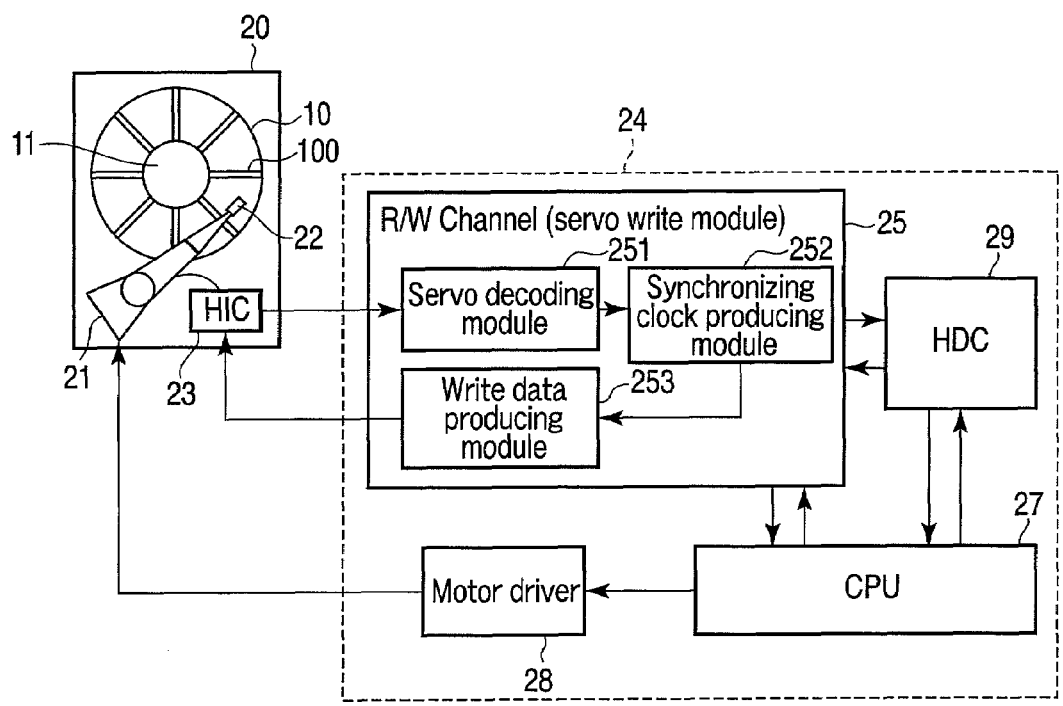
F I G. 4
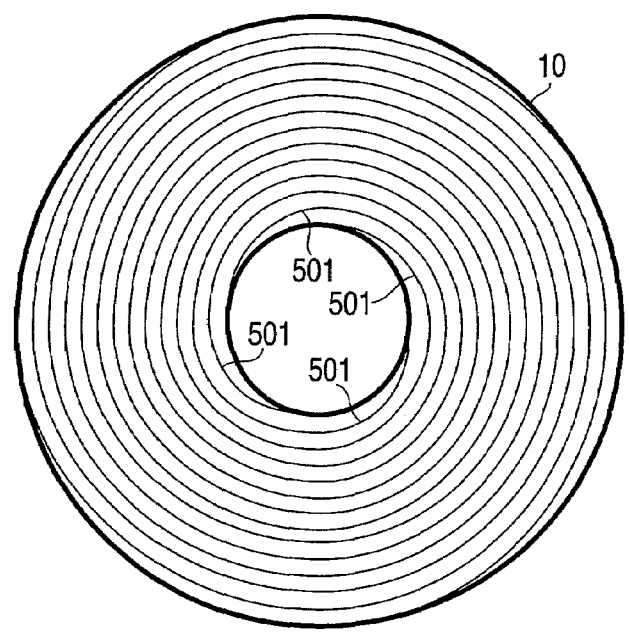
F I G. 5

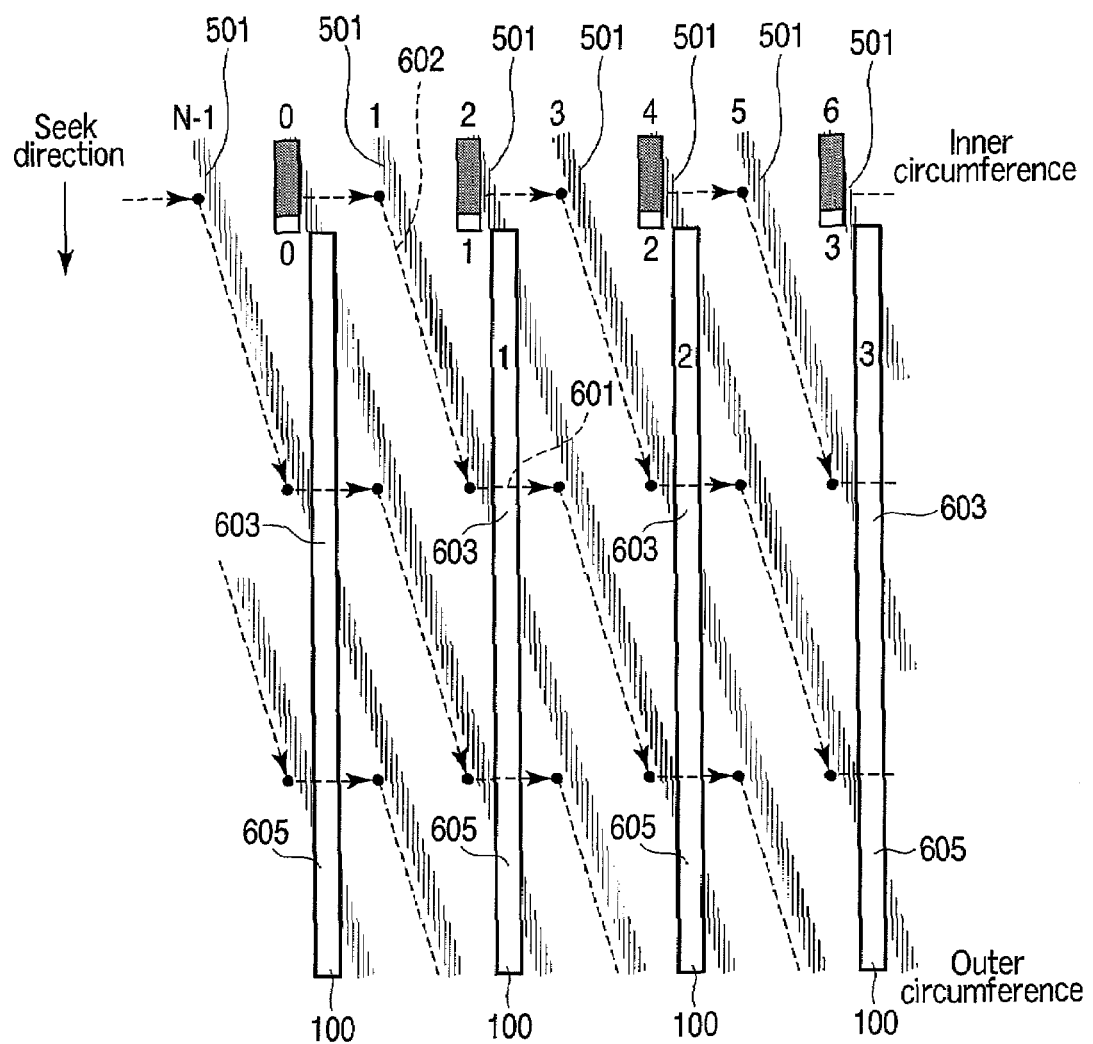
F I G. 6

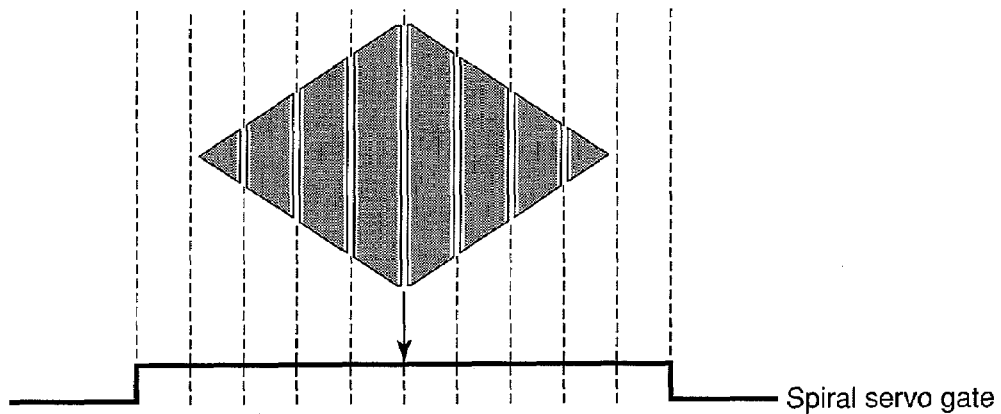
F I G. 13
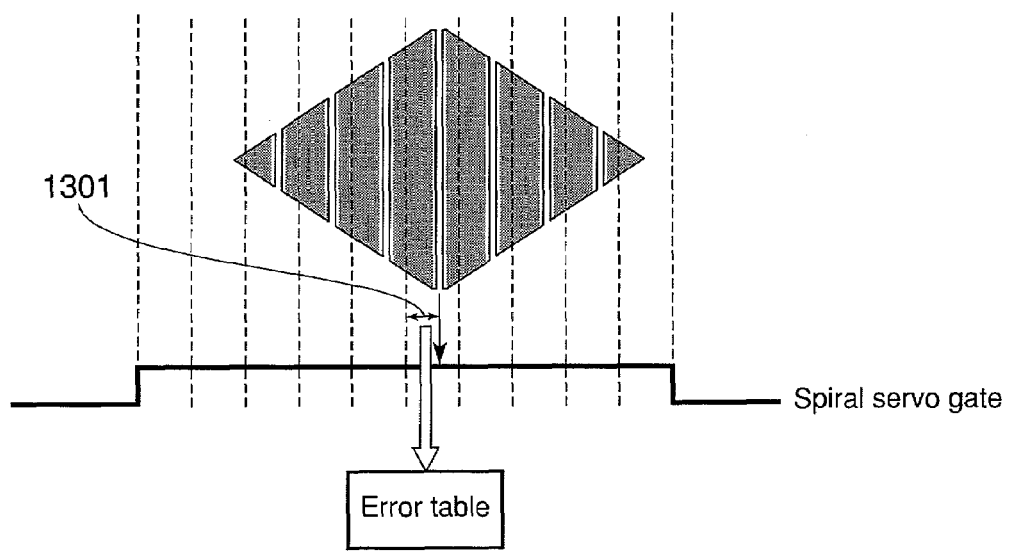
F I G. 14

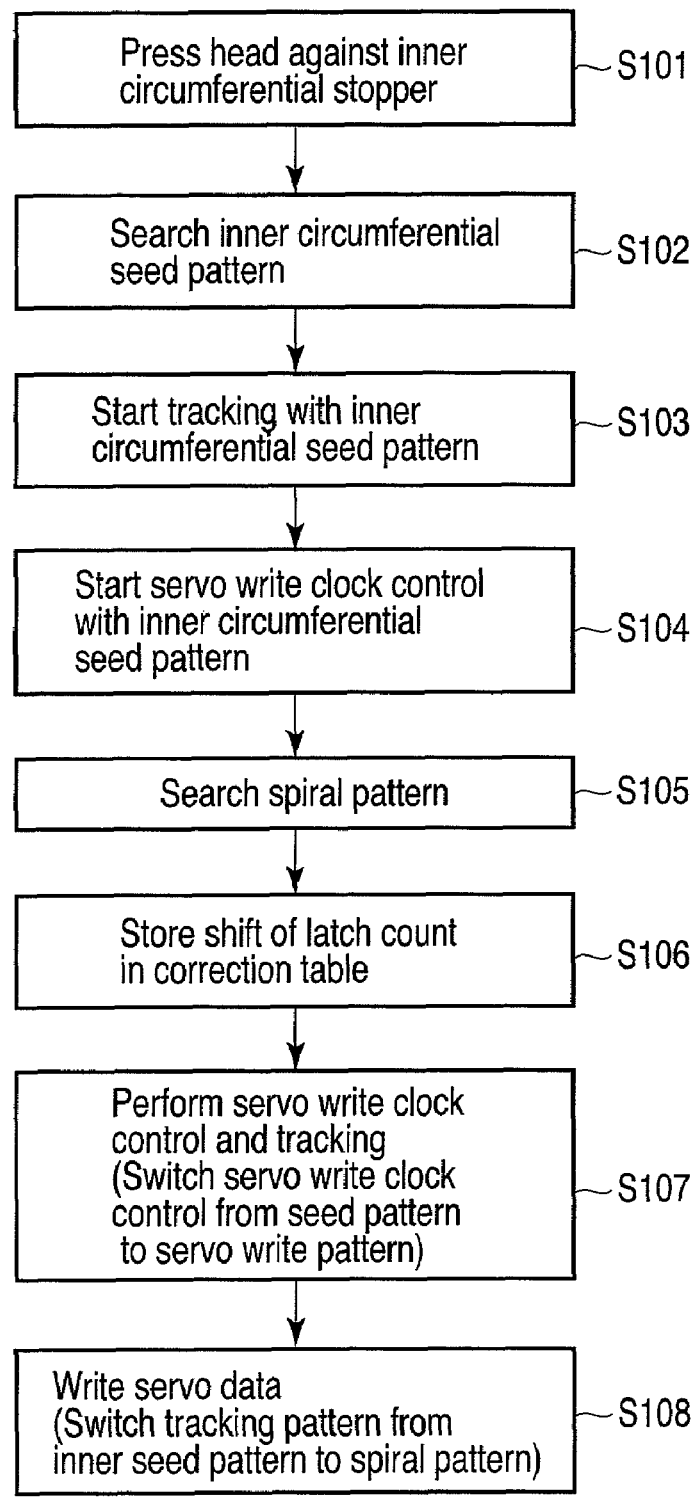
F I G. 15

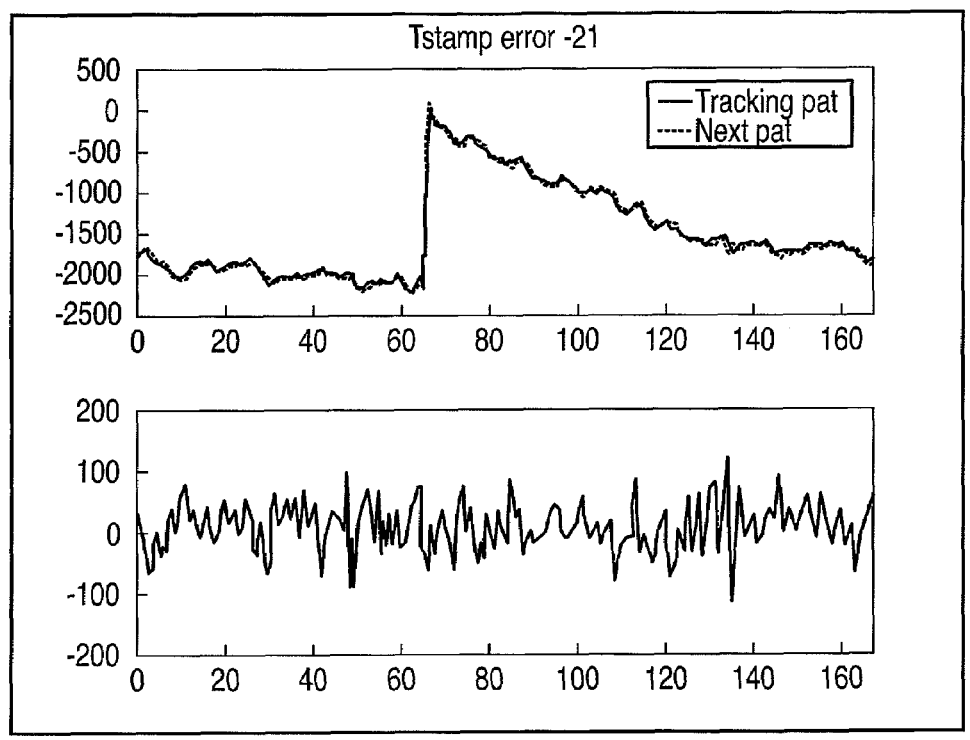
F I G. 22A
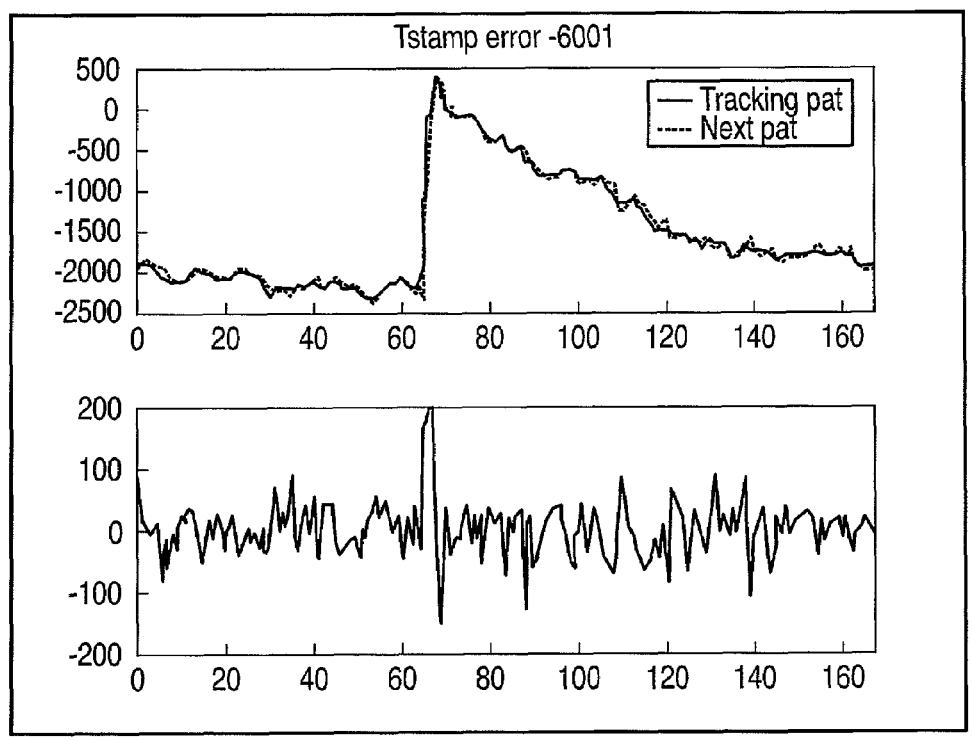
F I G. 22B

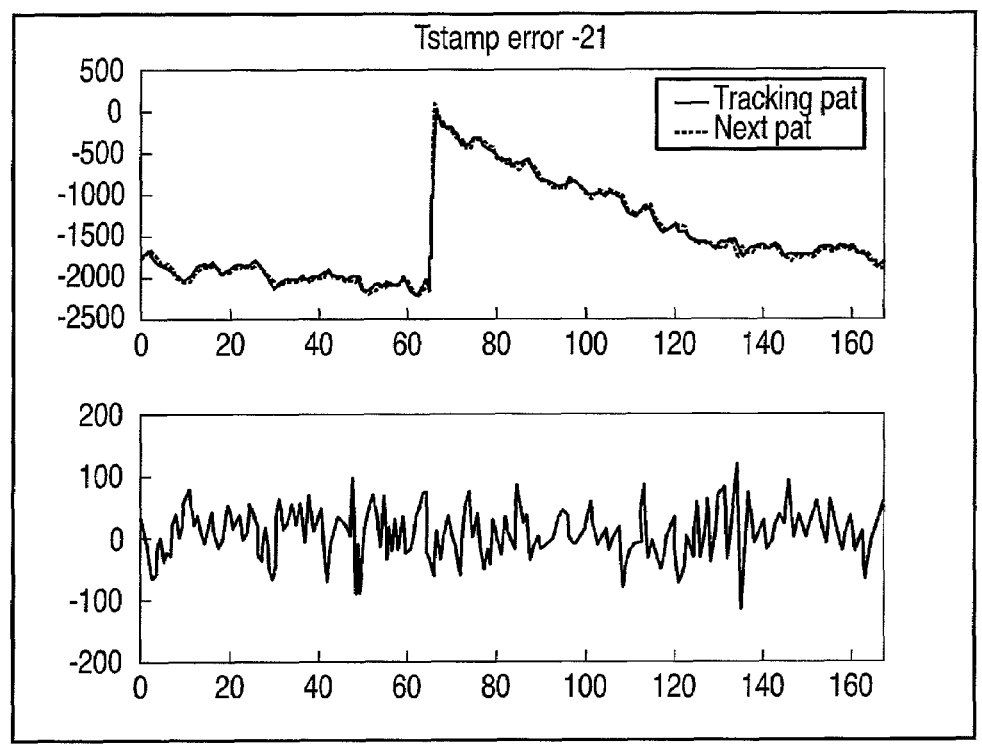
F I G. 23A
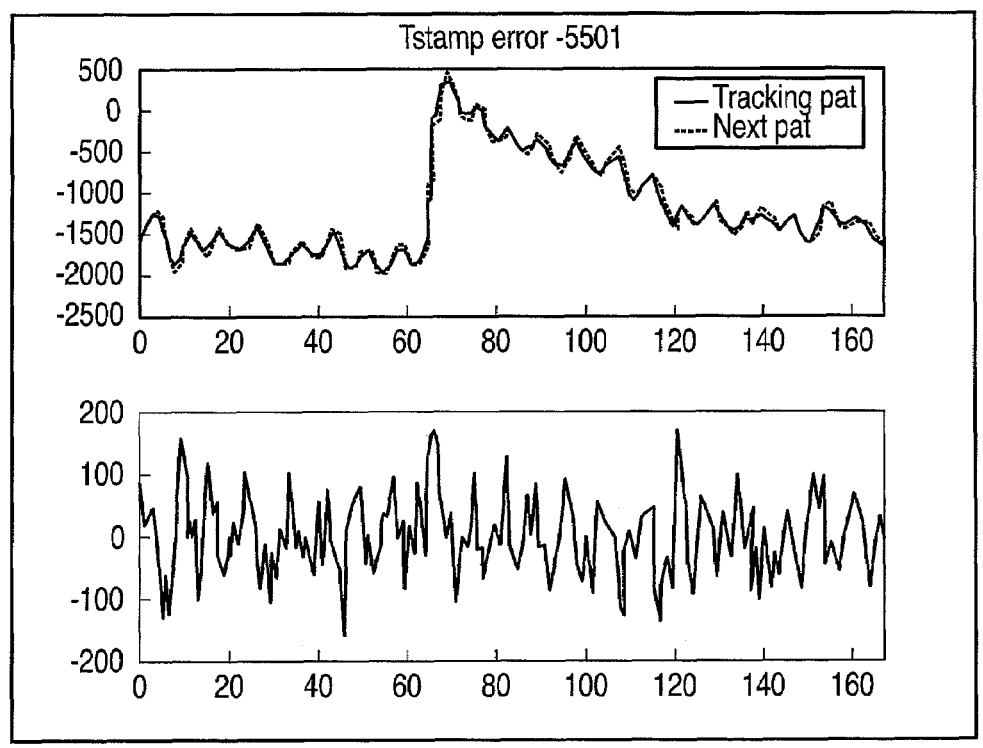
F I G. 23B

DISK DRIVE DEVICE AND SERVO WRITE METHOD

CROSS-REFERENCE TO RELATED APPLICATIONS

This application is based upon and claims the benefit of priority from Japanese Patent Application No. 2007-338250, filed Dec. 27, 2007, the entire contents of which are incorporated herein by reference.

BACKGROUND

1. Field

One embodiment of the invention relates generally to a disk drive device, particularly to a servo write technique of utilizing a multi servo spiral servo pattern to write a product servo pattern on a disk media.

2. Description of the Related Art

Generally, in a disk drive device such as a hard disk drive, a servo pattern (servo data) used in head positioning control (servo control) of a head is recorded on a disk media which is of a magnetic recording media.

In the disk drive, the head is positioned at a target position (target track) on the disk media using the servo pattern read by a read head included in the head. The read head performs an operation for reading data from the target position on the disk media. A write head included in the head performs an operation for writing data in the target position on the disk media.

The servo pattern is recorded on the disk media through a servo write process included in a disk drive production process. A self servo-writing method is receiving attention for the purpose of the efficient servo write process. In the self servo-writing method, the disk media in which a base pattern is previously recorded is incorporated in the disk drive, and the servo pattern is written on the disk media based on the base pattern using the head in the disk drive.

Recently, in the self servo-writing method, there is proposed a method in which plural spiral servo patterns are used as the base pattern to record a radial servo pattern on the disk media (for example, see U.S. Pat. No. 5,668,679 and U.S. Pat. No. 6,965,489).

The radial servo pattern is of the product servo pattern which defines concentric tracks. The radial servo pattern is of the servo pattern (sometimes referred to as final pattern) which is used in the head positioning control in the disk drive shipped as a product.

A burst signal into which sync marks are inserted at predetermined intervals is recorded in each spiral servo pattern. The burst signal is used to produce a position error signal. In the disk drive, the plural spiral servo patterns are used in a tracking (positioning) operation of the head.

Usually, in the case where plural radial servo patterns are written on the disk media by the self servo-writing method, the disk drive device is operated in synchronization with a servo write clock which is of a reference clock. Not only the servo write clock is used to write the radial servo pattern, but also the servo write clock is utilized as the reference clock for reading the spiral servo pattern.

Therefore, accuracy of the servo write clock becomes significant in order to accurately write the radial servo pattern on the disk media.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 4 is an exemplary block diagram showing a configuration of a disk drive device according to the embodiment;

FIG. 5 shows an example of a multi spiral servo pattern recorded on the disk media used in the disk drive device according to the embodiment;

FIG. 6 shows a positional relationship between the multi spiral servo pattern and a radial servo pattern on the disk media of FIG. 5;

FIG. 13 is an exemplary view for explaining an ideal latch count;

FIG. 14 is an exemplary view for explaining a shift in latch count;

FIG. 15 is an exemplary flowchart showing an example of a procedure of a self servo write process performed by the disk drive device according to the embodiment;

FIG. 22A and FIG. 22B show an example of an inter-pattern difference of a latch count; and FIG. 23A and FIG. 23B show an example of an inter-pattern difference of latch count.

DETAILED DESCRIPTION

Various embodiments according to the invention will be described hereinafter with reference to the accompanying drawings. In general, according to one embodiment of the invention, there is provided a disk drive device including: a disk media in which a plurality of spiral servo patterns are written; and a servo write module. The servo write module is configured to be operated in synchronization with a servo write clock, to write radial servo patterns on the disk media using a first spiral servo pattern of the spiral servo patterns as a base pattern for tracing, to detect a shift amount of a sync mark position in each of other spiral servo patterns with respect to a sync mark position in the first spiral servo pattern, and to adjust, when the base pattern is switched from the first spiral servo pattern to a second spiral servo pattern of the spiral servo patterns, a phase of the servo write clock based on the detected shift amount corresponding to the second spiral servo pattern.

Figure 1:
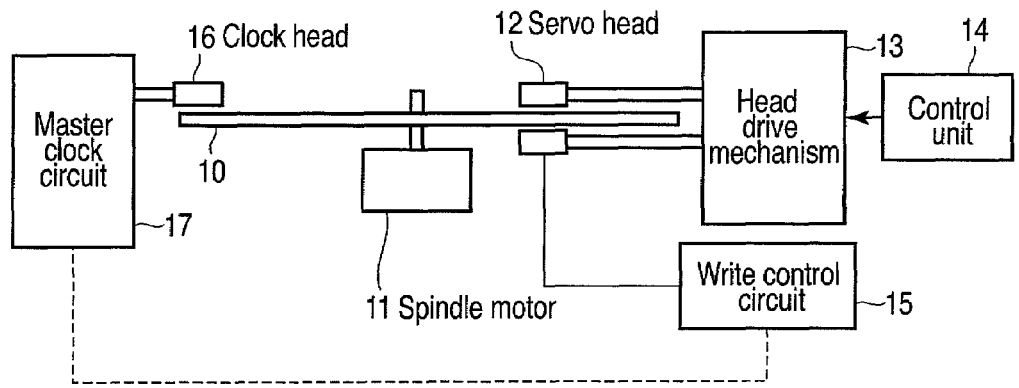
FIG. 1 is an exemplary block diagram showing a configuration of a servo track writer.

FIG. 1 shows a main part of a servo track writer (STW) used in a servo write process. As used herein, the servo write process shall mean a process of writing a servo pattern (servo data) on a disk media 10 which is of a magnetic disk, in a disk drive production process.

Generally, the servo track writer is installed in a clean room. The servo track writer writes the servo pattern on the disk media 10 in which no pieces of data is written. As shown in FIG. 1, the servo track writer includes a servo head 12 which writes the servo pattern in the disk media 10, a head drive mechanism 13, a control unit 14, a write control circuit 15, a clock head 16, and a master clock circuit 17.

The control unit 14 controls the head drive mechanism 13 to move and position the servo head 12 to a designated position on the disk media 10. The disk media 10 is rotated by the spindle motor 11. The write control circuit 15 delivers the servo data to the servo head 12. The servo head 12 writes the servo pattern in the designated position on the disk media 10.

In the embodiment, as shown in FIG. 5, plural spiral servo patterns 501 are written as a base pattern on the disk media 10 using the servo track writer. The base pattern is used to write plural radial servo patterns which are of a product servo pattern. The plural spiral servo patterns 501 are referred to as multi spiral servo pattern.

Figure 2:
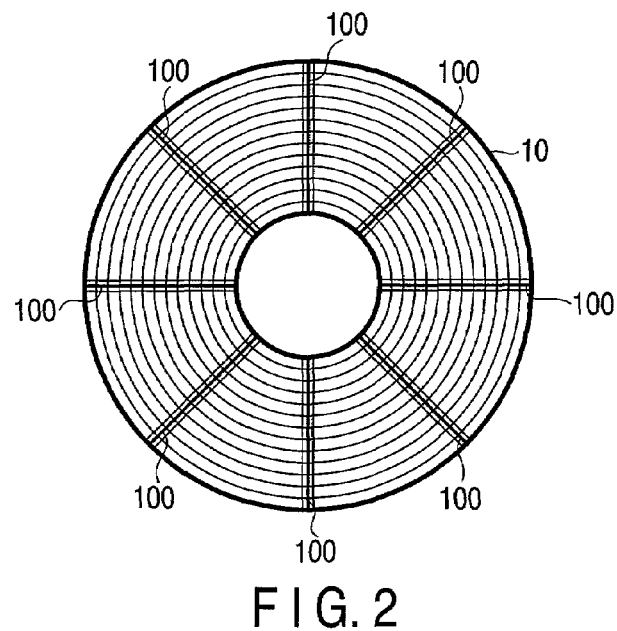
FIG. 2 shows a product servo pattern (radial servo pattern) which should be recorded on a disk media used in a disk drive device according to an embodiment of the invention.

In the embodiment, as shown in FIG. 2, plural radial servo patterns 100 are written on the disk media 10 by a self servo-writing (self-servo write) method. The plural radial servo patterns 100 constitute a concentric servo tracks.

In the self servo-writing process, the disk media 10 on which the plural spiral servo patterns 501 are written with the servo track writer is incorporated in a disk drive device 20 shown in FIG. 4. The disk drive device 20 performs head positioning control of a head 22 in the disk drive device 20 based on the plural spiral servo patterns 501 recorded on the disk media 10, and the disk drive device 20 writes the plural radial servo patterns 100 which are of the product servo pattern on the disk media 10.

Figure 3:
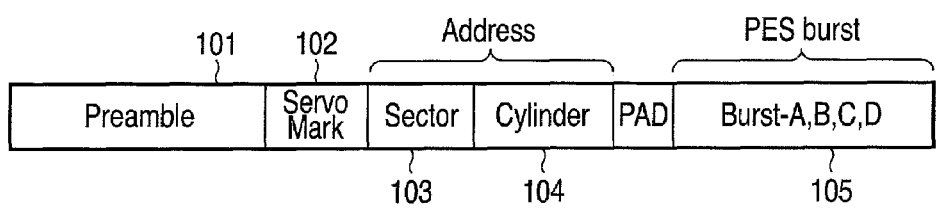
FIG. 3 shows servo information written in each servo sector included in the product servo pattern of FIG. 2.

The plural radial servo patterns 100 constitute the concentric servo tracks. FIG. 2 shows an example in which the eight radial servo patterns 100 are written on the disk media 10. Each radial servo patterns 100 includes servo sectors which are respectively disposed in the plural concentric tracks. That is, the eight servo sectors corresponding to the eight radial servo patterns 100 are disposed on each of the concentric tracks. As shown in FIG. 3, each servo sector includes a preamble 101, a servo mark 102, a sector address 103, a cylinder (track) address 104, and a servo burst pattern (servo burst A, servo burst B, servo burst C, and servo burst D) 105.

As shown in FIG. 4, the disk drive device 20 of the embodiment includes an actuator arm (head moving mechanism) 21 on which the head 22 is mounted, a head amplifier IC (HIC) 23, and a printed circuit board 24. The head 22 is provided at a forefront of the actuator arm 21. The head 22 is a co-called integrated head which includes a read head and a write head. The read head is used to read the data (or servo pattern) from the disk media 10, and the write head is used to write the data (or servo pattern) in the disk media 10.

The actuator arm 21 is driven by a voice coil motor (VCM, not shown), and the actuator arm 21 moves the head 22 in a radial direction on the disk media 10.

A read/write (R/W) channel IC 25, a microprocessor (CPU) 27, a motor driver 28, and a hard disk controller (HDC) 29 are mounted on the printed circuit board 24.

The read/write channel IC 25 is a signal processing circuit which processes a read/write signal corresponding to data (servo pattern or user data). The read/write channel IC 25 reproduces the user data read by the read head, and the read/write channel IC 25 delivers the user data to HDC 29. The read/write channel IC 25 converts the user data supplied from HDC 29 into a write signal, and the read/write channel IC 25 supplies the write signal to the head amplifier circuit 23.

The read/write channel IC 25 includes a servo decoder 251, a synchronizing clock producing module 252, and a write data producing module 253. The servo decoder 251 decodes the servo pattern read by the read head. The synchronizing clock producing module 252 produces a servo write clock (servo write clock signal) which is of a reference clock. The write data producing module 253 controls the write of data such as the servo data in synchronization with the servo write clock.

The read/write channel IC 25 acts as a servo write module which performs a self servo write process in cooperation with CPU 27. In the self servo write process, under the control of CPU 27, the read/write channel IC 25 uses plural spiral servo patterns 501 to write the plural radial servo patterns 100 on the disk media 10 while moving the head 22 from one side to the other side of an inner circumferential region or an outer circumferential region on the disk media 10.

The motor driver 28 drives the spindle motor 11 and the voice coil motor according to the control of CPU 27. The voice coil motor rotates the actuator arm 21. CPU 27 is a main controller of the disk drive device 20, and CPU 27 has a function of controlling the self servo write operation of the embodiment.

FIG. 4 shows only components of the embodiment in components of the disk drive device 20. A part of the function of the read/write channel IC 25 may be provided in HDC 29.

In the self servo write process, CPU 27 uses the plural spiral servo patterns 501 (FIG. 5) recorded on the disk media 10 as a tracking pattern. Using the plural spiral servo patterns 501, CPU 27 performs a tracking operation for positioning the head 22 at a target position (target track on the disk media 10) on the disk media 10.

One spiral servo pattern 501 has a length of about 10 to about 20 rotations. For example, about 200 to 300 spiral servo patterns 501 are written on the disk media 10. The one spiral servo pattern 501 can be written on the disk media 10 by one-time full track seek. Accordingly, the adoption of the self servo write method for writing the plural spiral servo patterns 501 as the base pattern on the disk media 10 can realize significant reduction of a time during which the servo writer (FIG. 1) is used in the clean room.

Figure 7:
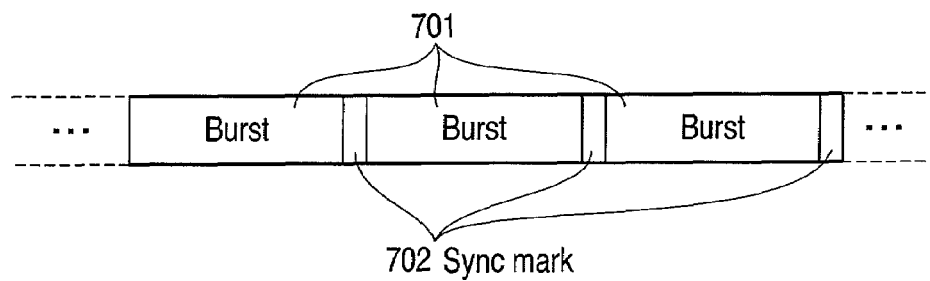
FIG. 7 shows an example of servo information included in each spiral servo pattern in the multi spiral servo pattern.

FIG. 6 shows a positional relationship between the spiral servo pattern 501 and the radial servo pattern 100. In FIG. 6, a horizontal axis indicates a time, and a vertical axis indicates a radial position on the disk media 10. The plural spiral servo patterns 501 are arranged in parallel and at equal intervals. One spiral servo pattern 501 includes a burst signal in which sync marks are inserted at predetermined intervals. The burst signal is used to produce a position error signal, which is used to perform tracking of the head 22. That is, as shown in FIG. 7, the one spiral servo pattern 501 includes burst signals 701 and sync marks 702. In the spiral servo pattern 501, plural sets of burst signals 701 and sync marks 702 are repeatedly recorded with no space between the sets.

The disk drive device 20 of the embodiment performs the self servo write process of writing the radial servo patterns 100 (servo sectors) which are of the product servo pattern (final pattern) on the disk media 10. In the self servo write process, the tracking is performed using the plural spiral servo patterns 501 previously written on the disk media 10. In order to accurately perform the self servo write process, it is necessary to produce a high-accuracy servo write clock. The servo write clock is of the reference clock. The disk drive device 20 is operated in synchronization with the servo write clock to perform the self servo write process. The servo write clock is used to produce timing at which the radial servo pattern 100 is written. The servo write clock is also used to produce timing at which the spiral servo pattern 501 is read. The accuracy of servo write clock is significant in order to accurately write the radial servo pattern 100.

The positional relationship between the spiral servo pattern 501 and the radial servo pattern 100 will be described with reference to FIG. 6.

A format in which two spiral servo patterns 501 exist per one radial servo pattern 100 is used in the embodiment. Each radial servo pattern 100 is perpendicularly extended with respect to the scanning direction (circumferential direction of a disk media 10) of the head 22 (read head). On the other hand, each spiral servo pattern 501 is obliquely extended with respect to the scanning direction (circumferential direction of a disk media 10).

FIG. 6 shows an example in which N spiral servo patterns 501 are arranged on the disk media 10. In FIG. 6, the numerals 0 to N-1 designate numbers of the spiral servo patterns 501, respectively.

In the self servo write process, CPU 27 writes some servo sectors in each concentric track on the disk media 10 while performing the tracking of the head 22 using one of the spiral servo patterns 501, thereby writing the plural radial servo patterns 100 on the disk media 10. The self servo write process is performed while the head 22 is moved in the radial direction from one side to the other side of the inner circumferential region or outer circumferential region on the disk media 10. In FIG. 6, it is assumed that the self servo write process is performed while the head 22 is moved from the inner circumference toward the outer circumference on the disk media 10.

For example, supposing that the spiral servo pattern 501 of a number 1 is used as the base pattern for tracking, CPU 27 uses the spiral servo pattern 501 of the number 1 as the base pattern until the radial position of the head 22 reaches a position 603 where the spiral servo pattern 501 of the number 1 overlaps the radial servo pattern 100 of the number 1. CPU 27 uses the spiral servo pattern 501 of the number 1 to position the head 22 at the target position (target concentric track) where the radial servo pattern 100 should be written on the disk media 10. Then, CPU 27 writes predetermined servo data (FIG. 3) for the radial servo pattern at target position on the disk media 10. Thus, the servo sector corresponding to each of the plural radial servo patterns 100 is written on each concentric track.

When the radial position of the head 22 reaches the position 603 where the spiral servo pattern 501 of the number 1 overlaps the radial servo pattern 100 of the number 1, the spiral servo pattern 501 of the number 1 cannot be used as the tracking base pattern. This is because the spiral servo pattern 501 of the number 1 is overwritten by the servo data written in the radial servo pattern 100 of the number 1.

Therefore, CPU 27 switches the spiral servo pattern which should be used as the tracking base pattern from the spiral servo pattern 501 of the number 1 to the adjacent spiral servo pattern 501 of a number 2. CPU 27 uses the spiral servo pattern 501 of the number 2 as the base pattern to position the head 22 at the target position (target concentric track) where the radial servo pattern 100 should be written on the disk media 10. CPU 27 writes the predetermined servo data (FIG. 3) for the radial servo pattern at target position on the disk media 10. Thus, the servo sector corresponding to each of the plural radial servo patterns 100 is written on each concentric track.

When the radial position of the head 22 reaches a position 605 where the spiral servo pattern 501 of the number 2 overlaps the radial servo pattern 100 of the number 2, the spiral servo pattern 501 of the number 2 cannot be used as the tracking base pattern. This is because the spiral servo pattern 501 of the number 2 is overwritten by the servo data written in the radial servo pattern 100 of the number 2. Therefore, CPU 27 switches the spiral servo pattern which should be used as the tracking base pattern from the spiral servo pattern 501 of the number 2 to the adjacent spiral servo pattern 501 of a number 3.

Thus, the process of switching the spiral servo pattern which should be used as the tracking base pattern is performed every time the radial position of the head 22 reaches the radial position where the spiral servo pattern in use as the base pattern overlaps the radial servo pattern.

As can be seen from the configuration of the burst signal of the spiral servo pattern shown in FIG. 7, address information is not included in the spiral servo pattern. Therefore, detection of the radial position of the head 22 depends only on information obtained from the position of a spiral servo gate signal. The spiral servo gate signal is a gate signal which is used to input the spiral servo pattern read by the head 22. Depending on inclination of each spiral servo pattern 501, pieces of information on relative positions of 10 to 20 cylinders are obtained based on the spiral servo gate signal.

A reference clock synchronized with a rotating speed of the disk media 10 is required to produce the spiral servo gate signal. The reference clock is of the above described servo write clock. The servo write clock is used to produce the spiral servo gate signal and to write the radial servo pattern 100.

Figure 8:
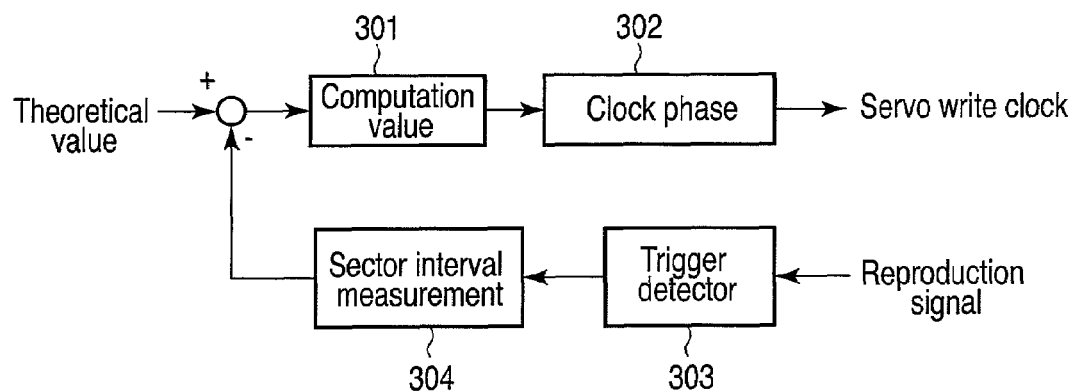
FIG. 8 is an exemplary block diagram showing an example of a circuit configuration for clock control, which is used in the disk drive device according to the embodiment.

For example, a method disclosed in U.S. Pat. No. 6,324,027 can be adopted as the method of producing the servo write clock to withstand the self servo write. In the method disclosed in U.S. Pat. No. 6,324,027, a time interval is measured between trigger patterns, and the servo write clock is adjusted to shift a phase of the servo write clock based on the measurement result. FIG. 8 shows a configuration example of a servo write clock producing unit to which the method disclosed in U.S. Pat. No. 6,324,027 is applied. The servo write clock producing unit includes a computation unit 301, a clock phase shift unit 302, a trigger detection module 303, and a sector interval measuring module 304. The trigger detection module 303 detects each trigger pattern. The sector interval measuring module 304 measures the time interval between the detected trigger patterns. The computation unit 301 and the clock phase shift unit 302 adjust the phase of the servo write clock based on the value obtained by subtracting the measured time interval from a predetermined theoretical value.

In the embodiment, the sync mark 702 of the spiral servo pattern 501 is used as the trigger pattern. The phase of the servo write clock is adjusted such that the interval between the trigger patterns becomes the constant number of clock counts.

A servo write clock producing method in the case where the embodiment is not used will be described below.

The phase of the servo write clock can be adjusted in such a manner that the time interval between the trigger patterns is measured to shift the phase of the servo write clock. The sync mark 702 of the spiral servo pattern is used as the trigger pattern, and the phase of the servo write clock is adjusted such that the interval between the trigger patterns becomes the constant number of clock counts.

Figure 9:
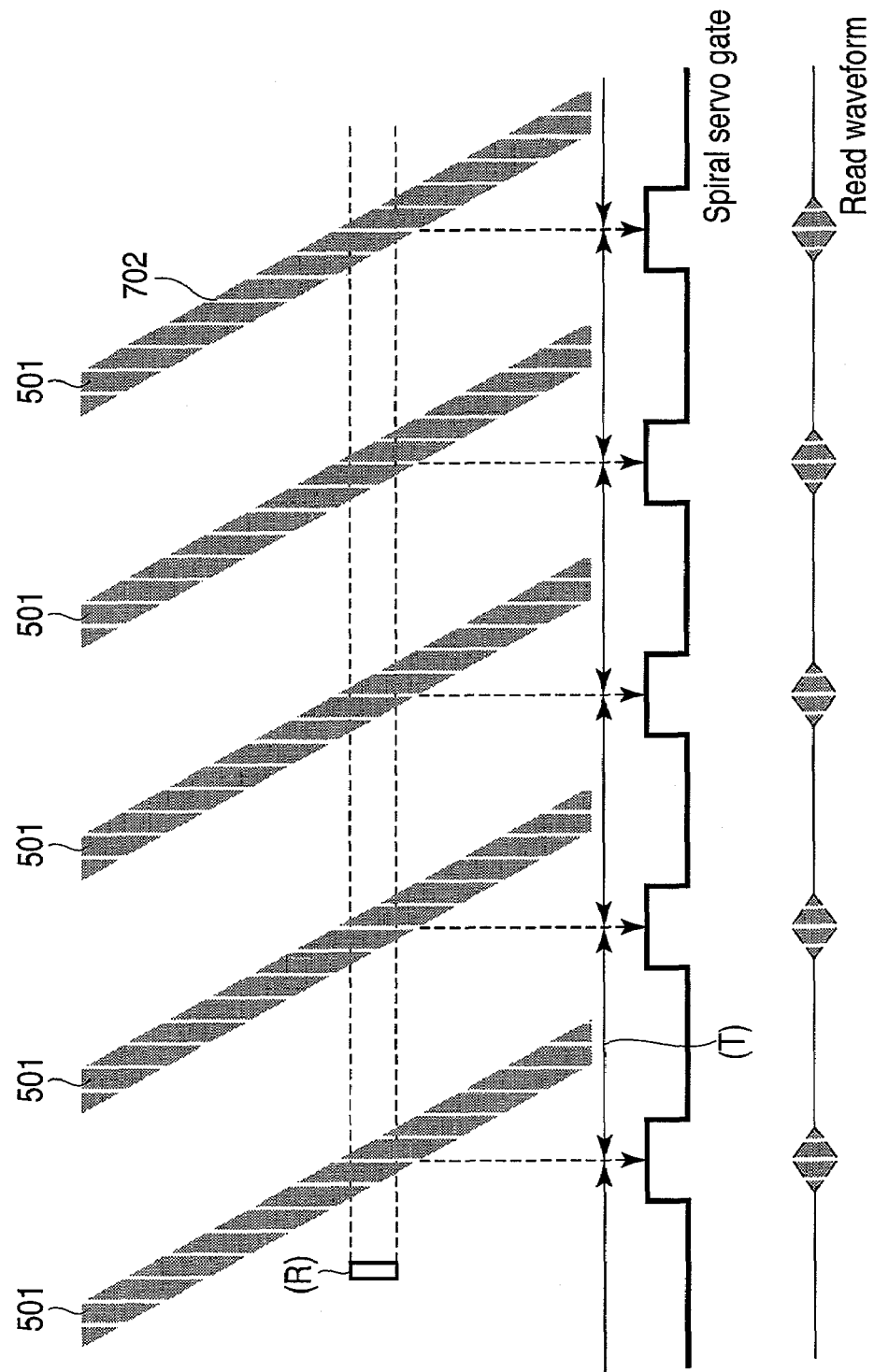
FIG. 9 shows a relationship among the spiral servo pattern, a spiral servo gate, and an output signal.

The time interval measuring counter is configured such that a count value is updated in synchronization with the servo write clock. Because the phase of the servo write clock is adjusted using the counter, for example, 256 counts are performed per one period of the servo write clock such that the sufficient accuracy can be ensured. The interval between the servo patterns is measured with the counter. FIG. 9 shows a state of the measurement.

FIG. 9 shows a waveform of a read signal which is obtained when the head 22 (read head (R) of the head 22) traverses the plural spiral servo patterns 501.

Each spiral servo pattern 501 includes the sync mark 702 (a white portion of the spiral servo pattern in FIG. 9). The spiral servo gate signal is opened (activated) at timing corresponding to the interval between the spiral servo patterns 501 in order to read the plural spiral servo patterns 501. The read head (R) reads the spiral servo pattern when the spiral servo gate signal is opened. An output signal of the spiral servo pattern read by the read head (R) has a rhombic waveform (read waveform). The gate timing of the spiral servo gate signal is determined based on the servo write clock. The count value of the counter is latched at a sync mark position of the read spiral servo pattern. CPU 27 computes a difference between count values of the two spiral servo patterns 501 adjacent to each other, thereby measuring the interval (T) between the patterns, that is, the time interval (T). Depending on the settings of the spiral servo pattern and spiral servo gate, the output signal of one spiral servo pattern may include plural sync marks. However, in the example of FIG. 9, for the purpose of simple explanation, it is assumed that the count value of the counter is latched at the sync mark position nearest to the center of the spiral servo gate.

CPU 27 compares an actual measurement value of the time interval (T) between the spiral servo patterns to a specification value (theoretical value) indicating a reference time interval between the spiral servo patterns. Based on the comparison result, CPU 27 controls the synchronizing clock producing module 252 to adjust the phase of the servo write clock such that the time interval (T) between the spiral servo patterns is brought close to the theoretical value in the next go-round. That is, CPU 27 adjusts the phase of the servo write clock such that the actual measurement value is increased when the actual measurement value is lower than the specification value, and CPU 27 adjusts the phase of the servo write clock such that the actual measurement value is decreased when the specification value is lower than the actual measurement value.

If the same spiral servo pattern can continuously be used from the inner circumference to the outer circumference on the disk media 10, the radial servo patterns 100 can be written only by adjusting the phase of the servo write clock. However, the portion (region indicated by numerals 603 and 605 of FIG. 6) in which the radial servo pattern 100 overlaps the spiral servo pattern is inevitably formed, because each radial servo pattern 100 is formed in the radial pattern as shown in FIG. 3. Accordingly, at the position where the spiral servo pattern 501, which is being used as the tracking base pattern, overlaps the radial servo pattern 100, the spiral servo pattern currently used in the tracking is eliminated once the servo data write is performed. Therefore, the tracking cannot be maintained.

In the embodiment, the format in which at least two spiral servo patterns 501 are disposed for one radial servo pattern 100 is used in order to avoid such situations. The process of switching the spiral servo pattern which should be used as the base pattern is performed every time the radial position of the head 22 reaches the radial position where the spiral servo pattern 501 which is being used as the base pattern overlaps the radial servo pattern 100.

The case in which the two spiral servo patterns 501 are used for the one radial servo pattern 100 will be described with reference to FIG. 6.

First it is assumed that the tracking is being performed using an odd-numbered spiral servo pattern (for example, spiral servo pattern of the number 1). As shown by an arrow 602, the spiral servo pattern of the number 1 can be used as the tracking base pattern to perform the tracking and seek until just before the head 22 reaches the position 603 where the spiral servo pattern 501 overlaps the radial servo pattern 100. Accordingly, until just before the head 22 reaches the position 603, the process of writing the plural radial servo patterns 100 can be performed using the spiral servo pattern of the number 1 while the head 22 is positioned on the target concentric track. As shown by an arrow 601, the spiral servo pattern used in the tracking is switched to the adjacent spiral servo pattern 501 (spiral servo pattern of the number 2) just before the radial position of the head 22 reaches the position 603.

Using the spiral servo pattern 501 of the number 2 as the tracking base pattern, the process of writing the plural radial servo patterns 100 can be performed by performing the tracking and seek until just before the radial position of the head 22 reaches the position 605 where the spiral servo pattern 501 of the number 2 overlaps the radial servo pattern 100 of the number 2. The spiral servo pattern used in the tracking is switched to the adjacent spiral servo pattern 501 (spiral servo pattern of the number 3) just before the radial position of the head 22 reaches the position 603.

However, when the spiral servo pattern used in the tracking is switched, the phase of the servo write clock is shifted before and after the spiral servo pattern which should be used as the base pattern is switched. As a result, there is possibly generated a problem in a seam between a portion of the radial servo pattern which is written before the switch of the spiral servo pattern and a portion of the radial servo pattern which is written after the switch of the spiral servo pattern.

Figure 10:
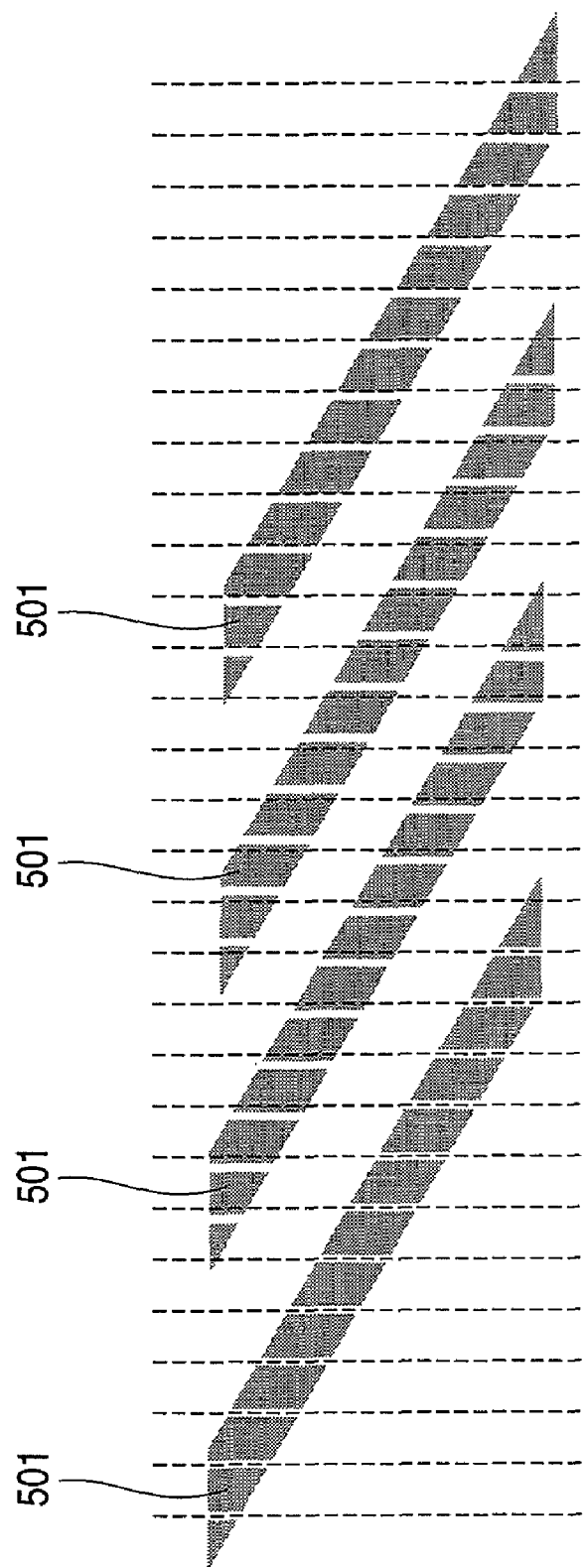
FIG. 10 is an exemplary view for explaining a shift in position of a sync mark in each spiral servo pattern.

As described above, the sync marks are inserted in each spiral servo pattern at predetermined intervals. The interval between the sync marks can substantially be kept constant in any spiral servo pattern 501. However, as shown in FIG. 10, sometimes the sync mark position is shifted between the spiral servo patterns 501. Because the spiral servo pattern 501 is separately written, it is difficult that the sync mark positions are completely matched to one another at all the spiral servo patterns 501.

Figure 11:
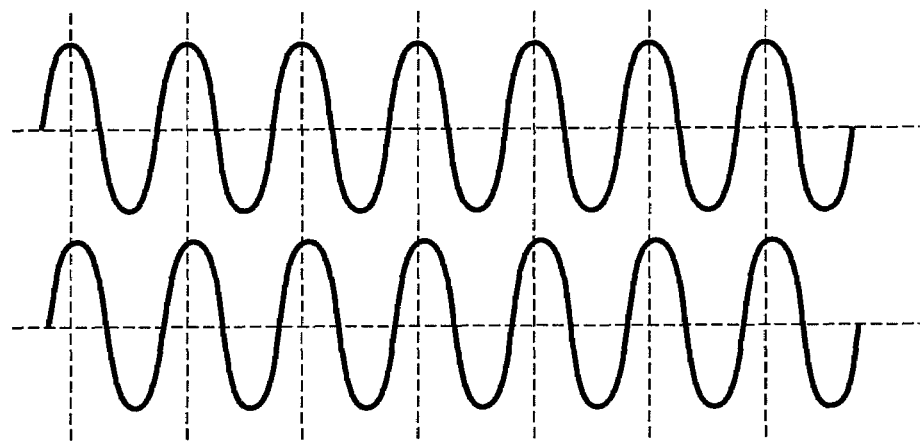
FIG. 11 is an exemplary view for explaining a shift in a phase of a servo write clock.

Thus, when the servo write clock is produced using the plural spiral servo patterns 501 in which the sync mark positions are shifted from one another, the phase of the servo write clock is shifted as shown in FIG. 11 before and after the switch of the spiral servo pattern which should be used as the tracking base pattern. The waveform shown in the upper portion of FIG. 11 indicates the servo write clock before the switch of the spiral servo pattern which should be used as the base pattern. The waveform shown in the lower portion of FIG. 11 indicates the servo write clock after the switch of the spiral servo pattern which should be used as the base pattern.

When the write of the radial servo pattern is continued using the servo write clock in which the phase is shifted, a discontinuous portion is generated in the radial servo pattern before and after the switch of the spiral servo pattern which should be used as the base pattern. The discontinuous pattern cannot be used as the product servo pattern.

For example, the switch of the spiral servo pattern which should be used as the base pattern is generated every time each radial servo pattern is written in about 10 tracks. Accordingly, the phase shift of the servo write clock, caused by the switch of the spiral servo pattern which should be used as the base pattern, is unacceptable.

In the embodiment, there is provided a method of preventing the generation of the phase shift of the servo write clock during the switch of the spiral servo pattern which should be used as the base pattern.

The phase shift of the servo write clock is attributed to the fact that the sync mark position included in the spiral servo pattern which is currently used as the base pattern is shifted from the sync mark position included in the spiral servo pattern which is newly used as the base pattern by the switch. A method of measuring the shift of the sync mark position and a method of correcting the shift of the sync mark position will be described with reference to FIGS. 12 to 14.

Figure 12:
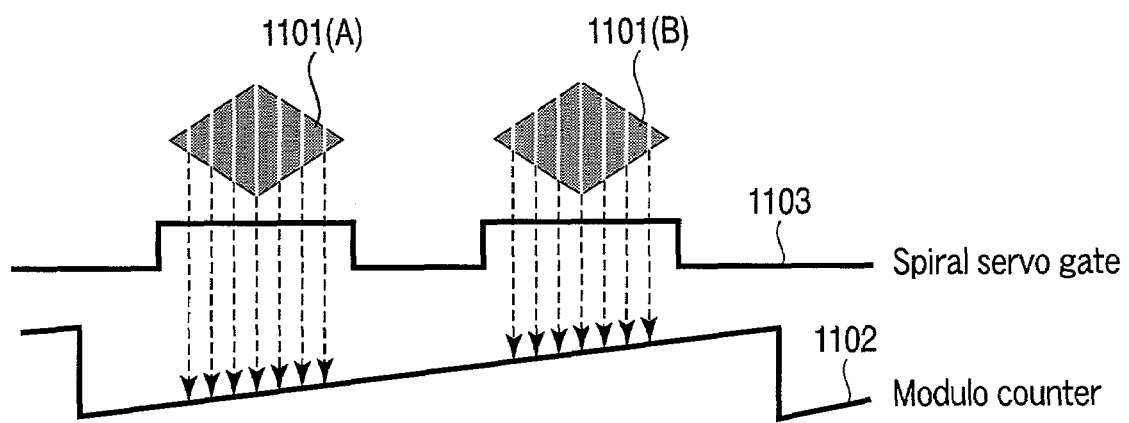
FIG. 12 is an exemplary view for explaining a method of measuring the shift in position of the sync mark.

Referring to FIG. 12, waveforms 1101 of the output signal are supplied from the read head when the read head sequentially passes through two spiral servo patterns. An output signal 1101(A) corresponds to a certain spiral servo pattern 501. An output signal 1101(B) corresponds to the adjacent spiral servo pattern 501.

Supposing that the tracking is performed using the output signal 1101 of a certain spiral servo pattern 501, because the servo write clock is adjusted using the output signal 1101(A), the servo write clock is controlled such that the count value (latch count value) in reading the sync marks in the output signal 1101(A) becomes the theoretical value. Therefore, an error is substantially eliminated between the latch count corresponding to the output signal 1101(A) and the theoretical value. As shown in FIG. 13, the latch count corresponding to the sync mark in the center of the gate width of the spiral servo gate signal can be used as the latch count value.

While CPU 27 controls the servo write clock using the output signal 1101(A) corresponding to the spiral servo pattern currently used as the base pattern, CPU 27 observes the latch count of the output signal corresponding to each of other spiral servo patterns. Therefore, CPU 27 detects a shift amount of the sync mark position in each of other spiral servo patterns with respect to the sync mark position in the spiral servo pattern currently used as the base pattern. For example, in the case where the shift amount of the sync mark position in the next spiral servo pattern with respect to the sync mark position in the spiral servo pattern currently used as the base pattern, the latch count corresponding to the sync mark position of the output signal 1101(B) corresponding to the next spiral servo pattern is observed. CPU 27 measures the shift amount (error) of the sync mark position in the output signal 1101(B) with respect to the sync mark position in the output signal 1101(A).

FIG. 14 shows the state of the output signal 1101(B). In FIG. 14, the latch count corresponding to the sync mark in the center of the gate width of the spiral servo gate signal is used like the case of FIG. 13. The error between the latch count and the theoretical value indicates the shift amount of the sync mark position between the output signal 1101(A) and the output signal 1101(B). A correction value indicating a shift amount 1301 is stored in an error table (also referred to as correction table).

The process of detecting the shift amount of the sync mark position to store the correction value indicating the shift amount in the error table is performed to each of the other spiral servo patterns except for the spiral servo pattern currently used as the base pattern. When the spiral servo pattern which should be used as the base pattern is switched, the correction value corresponding to the spiral servo pattern newly used as the base pattern is obtained from the error table. The phase of the servo write clock is adjusted based on the obtained correction value in order that the phase of the servo write clock is not shifted before and after the switch of the spiral servo pattern which should be used as the base pattern.

An example of a procedure of a process for writing the plural radial servo patterns 100 by using the plural spiral servo patterns 501 will be described with reference to the flow chart of FIG. 15. The process associated with the control of the servo write clock will mainly be described.

Figure 16:
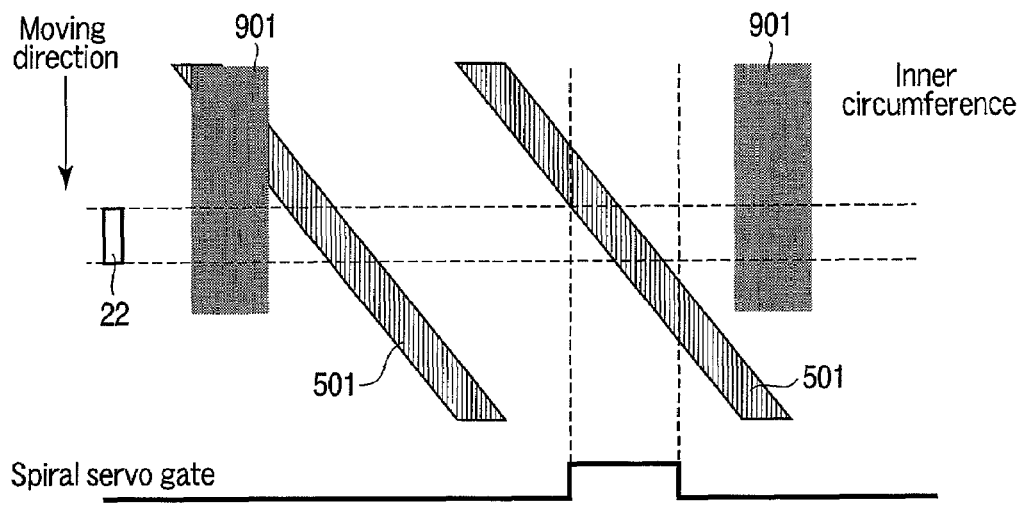
FIG. 16 shows an example of a spiral servo pattern search process performed by the disk drive device according to the embodiment.

In the embodiment, as shown in FIGS. 6 and 16, a reference servo pattern (hereinafter referred to as seed pattern) 901 constituting the concentric servo track is recorded in the inner-most circumference on the disk media 10. The seed pattern 901 has the same configuration as the radial servo pattern (see FIG. 3).

First CPU 27 loads the head 22 onto the disk media 10. Then, CPU 27 supplies a predetermined current to the voice coil motor (VCM) to drive the actuator arm 21, thereby pressing the actuator arm 21 against an inner circumferential stopper provided in the disk drive device 20 (Step S101). This enables the head 22 to be positioned in the inner-most circumferential region on the disk media 10.

At this point, CPU 27 performs the read operation with the read head to perform the process of searching the seed pattern (also referred to as an inner circumferential seed pattern) 901 (Step S102). When CPU 27 finds the seed pattern 901, CPU 27 starts the tracking operation to position the head 22 (read head) on the servo track including the seed pattern 901 (Step S103). Because a general technique of a magnetic disk device can directly be used in the searching and tracking of the seed pattern 901, the detailed description is omitted.

CPU 27 starts the control of the servo write clock using the seed pattern 901 (Step S104). The control of the servo write clock using the seed pattern 901 is described later with reference to FIG. 17.

Then, CPU 27 moves the head 22 from the inner circumferential side toward the outer circumferential side to search the initial spiral servo pattern which should be used as the base pattern (Step S105). CPU 27 measures the time interval from a time point the sync mark is read in the searched initial spiral servo pattern to a time point the sync mark is read in the next spiral servo pattern adjacent to the searched initial spiral servo pattern. CPU 27 adjusts the phase of the servo write clock according to the difference between the measured time interval and the predetermined reference time interval (theoretical value). CPU 27 also observes the output signal corresponding to each of other spiral servo patterns except for the searched initial spiral servo pattern. In each of other spiral servo patterns except for the searched initial spiral servo pattern, CPU 27 detects the shift amount (shift of latch count) of the sync mark position in each of the spiral servo pattern with respect to the sync mark position in the searched initial spiral servo pattern. CPU 27 stores the correction value indicating the detected shift amount in the error table (also referred to as correction table) (Step S106).

CPU 27 performs the process according to the difference between the reference time value and the time interval from the time point the sync mark is read in the searched initial spiral servo pattern to the time point the sync mark is read in the spiral servo pattern which is adjacent to the searched initial spiral servo pattern and used in the tracking. That is, CPU 27 performs the tracking operation (positioning operation) of the head 22 using the searched initial spiral servo pattern while finely adjusting the phase of the servo write clock according to the difference (Step S107 and S108). In Step S108, using the searched initial spiral servo pattern, CPU 27 positions the head 22 at the target position (target track) in which the radial servo pattern should be written on the disk media 10. Then, CPU 27 writes the predetermined servo data for the radial servo pattern at the target position.

CPU 27 performs the process of switching the spiral servo pattern which should be used as the base pattern every time the radial position of the head 22 reaches the radial position where the spiral servo pattern currently used as the base pattern overlaps the radial servo pattern. Specifically, CPU 27 switches the spiral servo pattern currently used as the base pattern to the spiral servo pattern adjacent to the spiral servo pattern currently used as the base pattern. At this point, CPU 27 obtains the correction value corresponding to the spiral servo pattern which should newly be used as the base pattern from the error table (correction table). CPU 27 adjusts the phase of the servo write clock according to the obtained correction value in order that the phase of the servo write clock is not shifted before and after the switch of the spiral servo pattern which should be used as the base pattern.

Then, using the new spiral servo pattern after the switch, CPU 27 positions the head 22 at the target position (target track) where the radial servo pattern should be written on the disk media 10. CPU 27 writes the predetermined servo data for the radial servo pattern in the target position. CPU 27 measures the time interval from the time point the sync mark is read in the new spiral servo pattern after the switch to the time point the sync mark is read in the spiral servo pattern which is adjacent to the new spiral servo pattern and used in the tracking. CPU 27 also performs the process of adjusting the phase of the servo write clock according to the difference between the measured time interval and the reference time interval.

A process of searching (detecting) the spiral servo pattern will be described with reference to FIG. 16.

As shown in FIG. 16, CPU 27 performs the process of seeking the spiral servo pattern 501 using the spiral servo gate signal. The spiral servo gate signal is a timing signal which is used to read the spiral servo patterns 501 recorded at equal intervals on the disk media 10. Usually HDC 29 produces the spiral servo gate signal.

Specifically, the searching process is performed by gradually moving the head 22 toward the outer circumferential direction while the timing position of the spiral servo gate signal is fixed. As shown in FIG. 16, the searching is ended when the radial position of the head 22 reaches the position, at which the spiral servo pattern 501 is read, while the timing position of the spiral servo gate signal is fixed.

CPU 27 performs the tracking operation (positioning operation) of the head 22 using the spiral servo pattern 501 from the time point the searching of the spiral servo pattern 501 is ended. That is, CPU 27 performs the tracking operation with no seed pattern 901 after the searching of the spiral servo pattern 501 is ended.

An operation for using the seed pattern 901 to control the servo write clock will be described with reference to FIG. 17.

Figure 17:
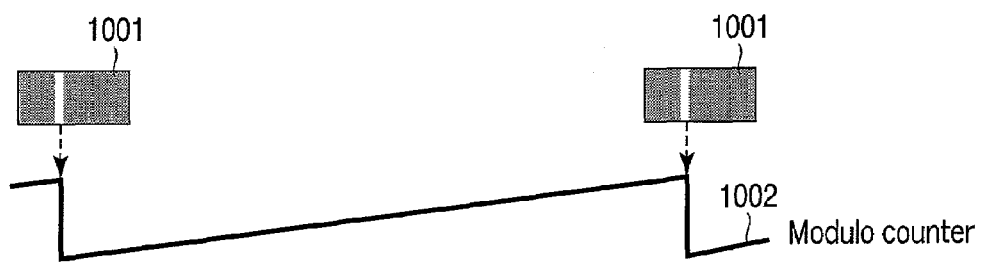
FIG. 17 is an exemplary view for explaining an example of a clock adjustment process, performed by the disk drive device according to the embodiment, in which a seed pattern is used.

In FIG. 17, the numeral 1001 designates an output signal obtained by reading the seed pattern 901 with the head 22, and the numeral 1002 designates a count value of a counter (modulo counter). The servo write clock is set so as to become a predetermined specification value. The specification value is a value of a frequency at which the radial servo pattern 100 is written. At this point, the servo write clock is not controlled.

The modulo counter is a counter which is used to measure the time interval between the sync marks of the two continuous seed patterns 901. The count value of the modulo counter is counted up in synchronization with the servo write clock. The count value of the modulo counter is returned to zero when the count value reaches the predetermined count value corresponding to the seed pattern interval. CPU 27 uses a sync mark detection signal in the output signal 1001 corresponding to the seed pattern as a trigger pattern which is used to synchronize the servo write clock with the rotation of the disk media 10. That is, CPU 27 latches the count value of the modulo counter when the sync mark is detected. CPU 27 applies the latched count value and the theoretical value ("0" in the case of the seed pattern) to the circuit of FIG. 8. This enables the servo write clock to be produced in synchronization with the rotation of the disk media 10.

Then, using the spiral servo gate signal, CPU 27 searches the initial spiral servo pattern which should be used as the base pattern. As described above, the spiral servo pattern is searched by gradually moving the head 22 toward the outer circumferential direction while the position of the spiral servo gate signal is fixed. As shown in FIG. 6, the searching is ended when the read head of the head 22 reaches the position where the spiral servo pattern 501 is read. The spiral servo pattern 501 can be read in the state where the searching is ended.

In order to enable the tracking using the searched spiral servo pattern 501, it is necessary that the production of the position error signal PES and the adjustment of the servo write clock be performed using the spiral servo pattern 501. The method of obtaining the position error information is well known. For example, as disclosed in U.S. Pat. No. 6,965, 489B1, the position error information can be computed from the output signal which is obtained by reading the burst signal of the spiral pattern with the read head.

The process of using the spiral servo pattern to adjust the servo write clock can be performed in the manner similar to the process of using the seed pattern to adjust the servo write clock. The process of using the spiral servo pattern to adjust the servo write clock can be performed by counting the count value corresponding to the interval (time interval) between the sync marks of the spiral servo patterns which are adjacent to each other and used in the tracking.

The process of using the spiral servo pattern to adjust the phase of the servo write clock will be described with reference to FIGS. 18 and 19.

Figure 18:
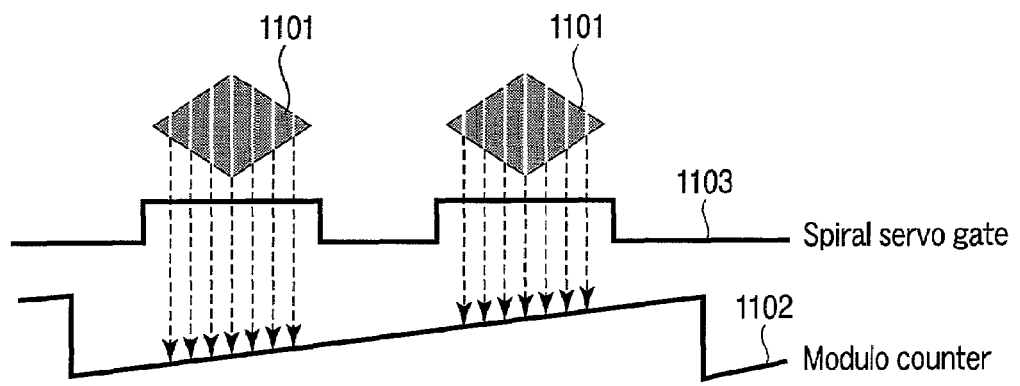
FIG. 18 is an exemplary view for explaining an example of a clock adjustment process, performed by the disk drive device according to the embodiment, in which a spiral servo pattern is used.

In FIG. 18, the output signal 1101 is obtained by reading the spiral servo pattern with the head 22. A spiral servo gate signal 1103 is used to read the spiral servo pattern. The numeral 1102 designates the count value of the modulo counter. The same modulo counter having the above-described configuration is used.

The timing at which the count value 1102 of the modulo counter is returned to zero is identical to the timing at which the sync mark is detected in the output signal 1001 corresponding to the seed pattern. The sync mark detection signal in the output signal 1101 corresponding to the spiral servo pattern is utilized to adjust the phase of the servo write clock. The plural latch counts corresponding to each of the plural sync mark detection signals are obtained, because the plural sync mark detection signals are included in the output signal 1101. Because the sync marks are arranged at equal intervals, one of the plural latch counts is taken out and used (see FIG. 19).

Figure 19:
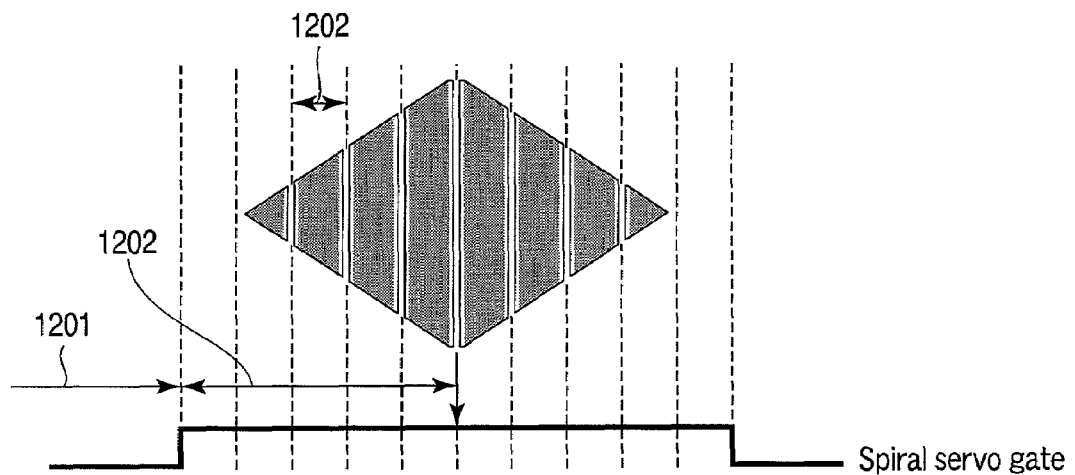
FIG. 19 is an exemplary view for explaining an ideal latch count.

FIG. 19 shows a position of an ideal latch count. It is assumed that CNTssg is a setting value 1201 of the spiral servo gate and CNTsync is a distance 1202 between the sync marks in the spiral servo pattern. In the case where N-th latch count from the head of the spiral servo gate signal is used, the interval from the start of the spiral servo gate signal to the latch count 1202 becomes CNTsync×N. Accordingly, the theoretical value of the latch count is obtained as follows:

$$\text{theoretical value} = CNTssg + (CNTsync \times N)$$

Figure 20:
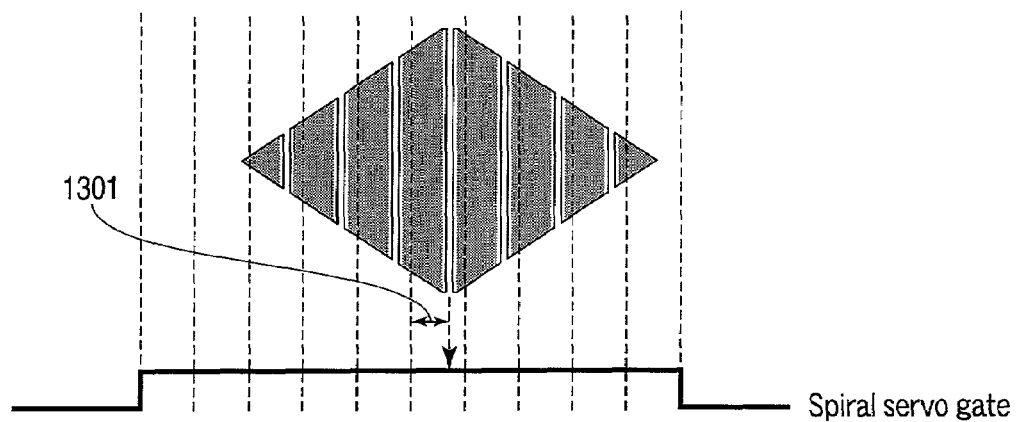
FIG. 20 is an exemplary view for explaining an actual latch count.

FIG. 20 shows an example of the actual count latch position.

Figure 21:
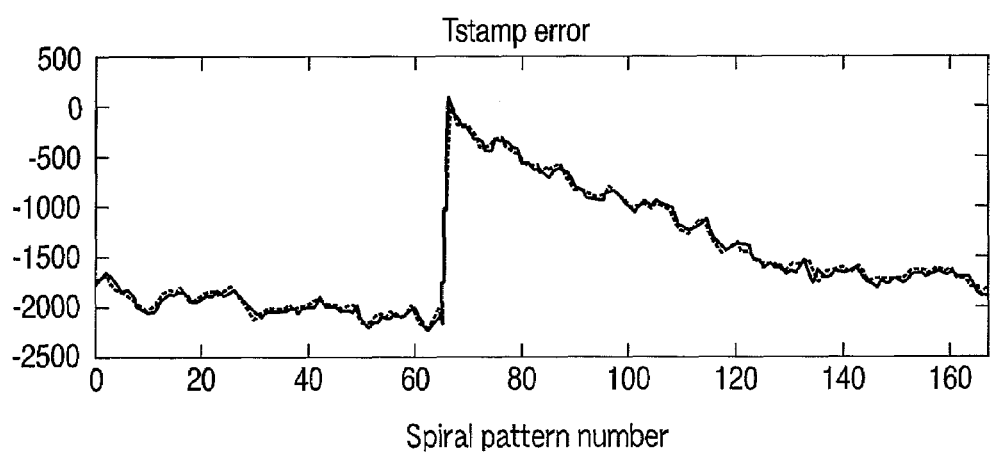
FIG. 21 shows an example of a correction value corresponding to each spiral servo pattern.

For example, as shown in FIG. 20, different latch count errors 1301 are possibly generated in respective spiral servo patterns by the influence such as a clock drift during the spiral servo write. In the embodiment, the phase of the servo write clock is adjusted based on the interval between the sync mark position in the spiral servo pattern searched as the base pattern and the sync mark position in the adjacent spiral servo pattern, and the latch count error is detected under the condition that the phase of the servo write clock is adjusted. In the detection of the latch count error, the sync mark position in the searched spiral servo pattern is used as a reference. That is, the shift amount of the sync mark position in each of other spiral servo patterns with respect to the sync mark position of the searched spiral servo pattern is detected as the latch count error. FIG. 21 shows an example in which the latch count error 1301 (given by CNTerr) is measured in each spiral servo pattern. In FIG. 21, a horizontal axis indicates each number of the spiral servo pattern, and a vertical axis indicates a value of the latch count error (tstamp error) corresponding to each spiral servo pattern. As shown in FIG. 21, the value of the latch count error corresponding to each spiral servo pattern is stored as the correction value in the correction table.

In the embodiment, the correction value corresponding to the spiral servo pattern which should newly be used as the base pattern is obtained from the correction table every time the spiral servo pattern which should be used as the base pattern is switched. The phase of the servo write clock is adjusted based on the correction value such that the latch count error of the spiral servo pattern which should newly be used as the base pattern is cancelled. For example, it is assumed that result, in which the correction value of the spiral servo pattern which should newly be used as the base pattern is subtracted from the theoretical value, is set at the new theoretical value. Therefore, the shift of the sync mark position in the spiral servo pattern which should newly be used as the base pattern can be cancelled.

$$\text{theoretical value} = CNTssg + (CNTsync \times N) - CNTerr$$

Even if the variation in a sync mark position exists between the spiral servo patterns, the servo write clock synchronized with the rotation of the disk media 10 can be produced from the spiral servo pattern through the above-described process.

Thus, according to the embodiment, the shift amount of the sync mark position in each of other spiral servo patterns with respect to the sync mark position in the searched servo pattern is detected, and the correction value indicating the detected shift amount is stored in the correction table. The correction value corresponding to the spiral servo pattern which should newly be used as the base pattern is obtained from the correction table to adjust the phase of the servo write clock every time the spiral servo pattern which should be used as the base pattern is switched. Therefore, the generation of the discontinuous portion can be prevented in the radial servo pattern before and after the spiral servo pattern which should be used as the base pattern is switched. Accordingly, the plural radial servo patterns can accurately be written on the disk media.

As described above, the seeking in which the spiral servo pattern is used is realized by the seeking (the numeral 602 of FIG. 6) which is performed on the same spiral servo pattern by moving the spiral servo gate and the transition to the adjacent spiral servo pattern (the numeral 601 of FIG. 6). For example, in the self-independent servo write process of writing the radial servo pattern, the spiral servo pattern which should be used as the base pattern is switched from the odd-numbered spiral servo pattern to the even-numbered spiral servo pattern. Then, the spiral servo pattern which should be used as the base pattern is switched to the odd-numbered spiral servo pattern. Accordingly, it is necessary that the correction value corresponding to each of the odd-numbered spiral servo patterns and the correction value corresponding to each of the even-numbered spiral servo patterns be stored in the correction table. In such cases, the correction value corresponding to each of the odd-numbered spiral servo patterns and the correction value corresponding to each of the even-numbered spiral servo patterns are separately measured, and the measured correction values may be stored in the correction table. For example, the correction value corresponding to each of the even-numbered spiral servo patterns is measured while the tracking and the clock phase adjustment are performed using a certain odd-numbered spiral servo pattern, and then the correction value corresponding to each of the odd-numbered spiral servo patterns may be measured while the tracking and the clock phase adjustment are performed using the next even-numbered spiral servo pattern.

The spiral servo pattern is formed by one pattern which is continued from the inner circumference to the outer circumference of the disk media, and the spiral servo pattern is written on the disk media 10 one by one. Therefore, there is a possibility that the spiral servo patterns differ slightly from one another in the clock used in the write. In such cases, the correction value of the count latch error (see FIGS. 14 and 20) is gradually changed as the head progresses from the inner circumference to the outer circumference. Accordingly, there is a possibility that the servo write clock is not normally generated at a position away from the start point.

This phenomenon can be confirmed by confirming the latch count error value of the modulo counter (see FIGS. 22A, 22B, 23A, and 23B). In FIGS. 22A, 22B, 23A, and 23B, the latch count error value of the spiral servo pattern which is used to generate the servo write clock and the latch count error value of the spiral servo pattern which is not used to generate the servo write clock are measured (graph on the upper side of each drawing), and a difference between odd pattern and the even pattern is computed (graph on the lower side of each drawing). Although the latch count error values has the substantially same shape in the seeking start (see FIG. 22A), the difference in latch count error correction value is increased only in the discontinuous portion at the position on the outer circumferential side (see FIG. 22B). The difference in latch count error correction value is increased with increasing moving distance is increased, and therefore the tracking cannot be performed.

This phenomenon can be improved by, for example, producing the latch count error correction values (CNTerr) at predetermined intervals again. FIGS. 23A and 23B show an example in which the correction value is produced again to perform the same measurement as that of FIGS. 22A and 22B every 400 times of the switch 601 of the spiral servo pattern which should be used as the base pattern. As can be seen from FIGS. 23A and 23B, the measurement result is improved on the outer circumferential side, and the seeking can be performed to the outer circumference.

In the embodiment, the seed pattern is formed in the inner circumferential region of the disk media 10. Alternatively, the seed pattern may be formed in the outer circumferential region of the disk media 10.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk drive device comprising:
    a head configured to read and write data;
    a disk media in which a plurality of spiral servo patterns are written as a base pattern for writing a plurality of radial servo patterns which are of a product servo pattern, each of the plurality of spiral servo patterns including a burst signal in which sync marks are inserted at predetermined intervals;
    a clock generating module configured to generate a servo write clock, the servo write clock being of a reference clock; and
    a servo write module configured to function in synchronization with the servo write clock, and to perform a self servo write process using the plurality of spiral servo patterns while moving the head on the disk media in a radial direction, the plurality of radial servo patterns being written on the disk media in the self servo write process, wherein
    the servo write module is configured to search a spiral servo pattern to be used as the base pattern, to measure a time interval from a time point at which a sync mark is read in the searched spiral servo pattern to a time point at which a sync mark is read in a spiral servo pattern adjacent to the searched spiral servo pattern, to adjust a phase of the servo write clock based on a difference between the measured time interval and a predetermined reference time interval, to detect a shift amount of a sync mark position in other spiral servo patterns with respect to a sync mark position in the searched spiral servo pattern to store a correction value indicating the detected shift amount in a correction table, to position the head at a target position where the radial servo pattern is written on the disk media using the searched spiral servo pattern to write predetermined servo data for the radial servo pattern at the target position, to switch the spiral servo pattern to be used as the base pattern when a radial position of the head reaches a radial position where the spiral servo pattern currently used as the base pattern and the radial servo pattern overlap each other, to obtain a correction value corresponding to a spiral servo pattern to be used as a base pattern from the table when the spiral servo pattern to be used as the base pattern is switched, and to adjust the phase of the servo write clock based on the obtained correction value.

2. The disk drive device of claim 1, wherein the servo write module is configured to switch the spiral servo pattern to be used as the base pattern from a spiral servo pattern currently used as a base pattern to a spiral servo pattern adjacent to the spiral servo pattern currently used as the base pattern.

3. The disk drive device of claim 1, wherein the servo write module is configured to measure a time interval from a time point a sync mark in a spiral servo pattern newly used as the base pattern is read to a time point a sync mark in a spiral servo pattern adjacent to the spiral servo pattern newly used as the base pattern is read when the spiral servo pattern to be used as the base pattern is switched, and to adjust the phase of the servo write clock based on a difference between the measured time interval and the predetermined reference time interval.

4. The disk drive device of claim 1, wherein a seed pattern corresponding to each of the plurality of radial servo patterns is recorded as a reference pattern in an inner circumferential region on the disk media, and
    the servo write module is configured to search the spiral servo pattern to be used as the base pattern by moving the head toward an outer circumference from the inner circumferential region of the disk media on which the seed pattern is recorded.

5. A disk drive device comprising:
    a head configured to read and write data;
    a disk media in which a plurality of spiral servo patterns are written, each of the plurality of spiral servo patterns comprising a burst signal in which sync marks are inserted at predetermined intervals, the plurality of spiral servo patterns being used to write a plurality of radial servo patterns which are of a product servo pattern;
    a clock generating module configured to generate a servo write clock, the servo write clock being of a reference clock; and
    a servo write module configured to function in synchronization with the servo write clock, and to perform a self servo write process using the plurality of spiral servo patterns while moving the head on the disk media in a radial direction, the plurality of radial servo patterns being written on the disk media in the self servo write process, wherein
    the servo write module is configured to search an initial spiral servo pattern to be used as the base pattern, to measure a time interval from a time point at which a sync mark is read in the searched initial spiral servo pattern to a time point at which a sync mark is read in a spiral servo pattern adjacent to the searched initial spiral servo pattern, to adjust a phase of the servo write clock based on a difference between the measured time interval and a predetermined reference time interval, to detect a shift amount of a sync mark position in other spiral servo patterns with respect to a sync mark position in the searched initial spiral servo pattern, to store a correction value indicating the detected shift amount in a correction table, to position the head at a target position where the radial servo pattern is written on the disk media using the searched initial spiral servo pattern to write predetermined servo data for the radial servo pattern at the target position, to switch the spiral servo pattern to be used as the base pattern when a radial position of the head reaches a radial position where the spiral servo pattern currently used as the base pattern and the radial servo pattern overlap each other, to obtain a correction value corresponding to a spiral servo pattern to be used as a base pattern from the table when the spiral servo pattern to be used as the base pattern is switched, to adjust the phase of the servo write clock based on the obtained correction value, to measure a time interval from a time point at which a sync mark in a spiral servo pattern newly used as the base pattern is read to a time point at which a sync mark in a spiral servo pattern adjacent to the spiral servo pattern newly used as the base pattern is read when the spiral servo pattern to be used as the base pattern is switched, and to adjust the phase of the servo write clock according to a difference between the measured time interval and the predetermined reference time interval.

6. A servo write method of writing radial servo patterns on a disk media in a disk drive device comprising a disk media, a head which reads and writes data from and to the disk media, and a clock generating unit which generates a servo write clock which is a reference clock, the disk drive device being operated in synchronization with the servo write clock, using a plurality of spiral servo patterns recorded on the disk media, each of the plurality of spiral servo patterns including a burst signal in which sync marks are inserted at predetermined intervals, while moving a head on the disk media in a radial direction, the disk drive device being operated in synchronization with the servo write clock, the method comprising:

searching a spiral servo pattern to be used as the base pattern;

measuring a time interval from a time point at which a sync mark is read in the searched spiral servo pattern to a time point at which a sync mark is read in a spiral servo pattern adjacent to the searched spiral servo pattern and adjusting a phase of the servo write clock based on a difference between the measured time interval and a predetermined reference time interval;

detecting a shift amount of a sync mark position in other spiral servo patterns with respect to a sync mark position in the searched spiral servo pattern and storing a correction value indicating the detected shift amount in a correction table;

positioning the head at a target position where the radial servo pattern is written on the disk media using the searched spiral servo pattern and writing predetermined servo data for the radial servo pattern at the target position;

switching the spiral servo pattern to be used as the base pattern when a radial position of the head reaches a radial position where the spiral servo pattern currently used as the base pattern and the radial servo pattern overlap each other; and obtaining a correction value corresponding to a spiral servo pattern to be newly used as a base pattern from the table when the spiral servo pattern to be used as the base pattern is switched and adjusting the phase of the servo write clock based on the obtained correction value.

7. The servo write method of claim 6, wherein the switching the spiral servo pattern to be used as the base pattern includes switching the spiral servo pattern to be used as the base pattern from a spiral servo pattern currently used as the base pattern to a spiral servo pattern adjacent to the spiral servo pattern currently used as the base pattern.

8. The servo write method of claim 6, further comprising:

measuring a time interval from a time point a sync mark in a spiral servo pattern newly used as the base pattern is read to a time point a sync mark in a spiral servo pattern adjacent to the spiral servo pattern newly used as the base pattern is read when the spiral servo pattern to be used as the base pattern is switched; and adjusting the phase of the servo write clock based on a difference between the measured time interval and the predetermined reference time interval.

9. The servo write method of claim 6, wherein a seed pattern corresponding to each of the plurality of radial servo patterns is recorded as a reference pattern in an inner circumferential region on the disk media, and the servo write method further comprises searching an initial spiral servo pattern to be used as the base pattern by moving the head toward an outer circumference from the inner circumferential region of the disk media on which the seed pattern is recorded.

* * * * *